(12) United States Patent
Louca et al.

(10) Patent No.: US 11,178,033 B2
(45) Date of Patent: Nov. 16, 2021

(54) NETWORK EVENT AUTOMATIC REMEDIATION SERVICE

(71) Applicant: Amazon Technologies, Inc., Seattle, WA (US)

(72) Inventors: Andreas Louca, Seattle, WA (US); Goran Peretin, Seattle, WA (US); João André Henriques Ferreira, Dublin (IE); Mark Noel Kelly, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/685,680

(22) Filed: Nov. 15, 2019

(65) Prior Publication Data

US 2020/0228430 A1    Jul. 16, 2020

Related U.S. Application Data

(63) Continuation of application No. 14/800,576, filed on Jul. 15, 2015, now Pat. No. 10,484,257.

(51) Int. Cl.
*H04L 12/26* (2006.01)

(52) U.S. Cl.
CPC .......... *H04L 43/0823* (2013.01); *H04L 43/04* (2013.01)

(58) Field of Classification Search
CPC ............................ H04L 43/0823; H04L 43/04
USPC ........................................................ 709/224
See application file for complete search history.

(56) References Cited

U.S. PATENT DOCUMENTS

| | | | |
|---|---|---|---|
| 7,047,273 B2* | 5/2006 | Kamentsky | ............. H04L 29/06 709/224 |
| 7,099,942 B1* | 8/2006 | Wilson | ..................... H04L 41/06 709/223 |
| 7,986,625 B2 | 7/2011 | Chase et al. | |
| 8,220,054 B1 | 7/2012 | Lu | |
| 9,088,615 B1 | 7/2015 | Avlasov et al. | |
| 9,098,333 B1 | 8/2015 | Obrecht et al. | |
| 2007/0026613 A1 | 11/2007 | Spire et al. | |
| 2008/0181100 A1* | 7/2008 | Yang | ................... H04L 41/0654 370/216 |
| 2011/0119375 A1 | 5/2011 | Beeco et al. | |
| 2012/0259962 A1* | 10/2012 | Bose | ....................... H04L 41/50 709/223 |
| 2013/0152097 A1 | 6/2013 | Boctor et al. | |
| 2013/0204975 A1 | 8/2013 | Keith, Jr. | |
| 2014/0164585 A1 | 6/2014 | Shaw et al. | |
| 2014/0172842 A1* | 6/2014 | Sumanth | ............. H04L 41/0609 707/723 |
| 2014/0280899 A1 | 9/2014 | Brewster, Jr. et al. | |

(Continued)

*Primary Examiner* — Tan Doan
(74) *Attorney, Agent, or Firm* — Klarquist Sparkman, LLP

(57) ABSTRACT

A network event remediation service receives event logs from network computing devices to identify issues associated with these network computing devices. Based on these issues, the service generates various tasks to address the identified issues. The service obtains historical task data in order to determine whether any tasks do not comport with historical tasks performed by the network computing devices and removing such tasks. The service obtains health data from the network computing devices to calculate device scores for each device. The service uses the device scores to prioritize the tasks for each network computing device. These tasks are then dispatched to the network computing devices.

19 Claims, 8 Drawing Sheets

(56) References Cited

U.S. PATENT DOCUMENTS

| | | | |
|---|---|---|---|
| 2015/0092535 A1* | 4/2015 | Kelsey | H04L 43/0811 370/218 |
| 2016/0072835 A1 | 3/2016 | Roytman et al. | |
| 2016/0080218 A1* | 3/2016 | Matthews | H04L 41/0823 709/224 |
| 2016/0155098 A1 | 6/2016 | McElhinney | |

* cited by examiner

NETWORK EVENT AUTOMATIC REMEDIATION SERVICE

CROSS REFERENCE TO RELATED APPLICATION

This is a continuation of U.S. application Ser. No. 14/800,576, filed Jul. 15, 2015 (now U.S. Pat. No. 10,484,257), which application is incorporated herein by reference in its entirety.

BACKGROUND

Organizations often employ large fleets of computing devices for various reasons, such as adding functionality, scalability, and availability. As the systems become larger and more complex, monitoring these systems to ensure proper operation also becomes more complex. An organization's operations, for instance, may be supported by a data center or even multiple data centers that include computer systems, networking devices, and other systems. Further, the architecture of distributed systems can involve multiple layers of dependency, often causing operational issues with one system that may affect numerous other systems. A single point of failure, for instance, can cause multiple other systems to fail or otherwise have degraded performance. Various techniques have been employed to monitor the systems. While such techniques facilitate the identification of problems and their solutions, as the number of devices being monitored grows, efficiently identifying the sources of problems and their solutions becomes more difficult.

BRIEF DESCRIPTION OF THE DRAWINGS

Various embodiments in accordance with the present disclosure will be described with reference to the drawings, in which.

DETAILED DESCRIPTION

Figure 1:
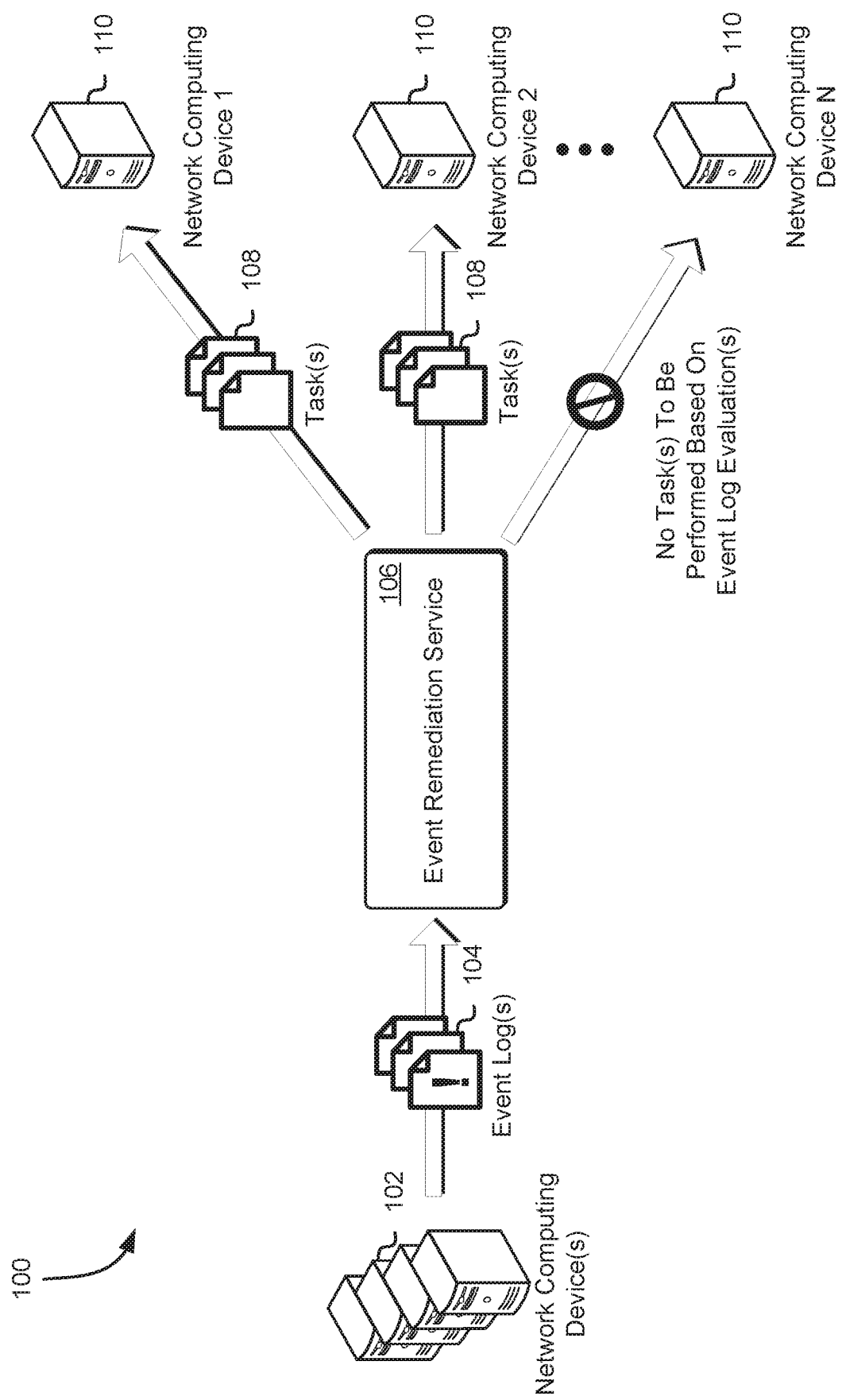
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to a network event remediation service configured to generate and prioritize tasks based on event logs obtained from various network computing devices in a network. At various times, the network event remediation service may receive event logs from various network computing devices and/or network monitoring systems within the network. The network event remediation service may evaluate these event logs to identify the various tasks that should be performed in order to address any issues detected with regard to the network computing devices. In an embodiment, once the network event remediation service has identified the various tasks that should be performed based on the received event logs, the network event remediation service will access a historical task data store to determine, for each network computing device, previous tasks performed on the network computing device in response to prior event logs received over time. This historical data may be used by the network event remediation service to determine whether any of the identified tasks for a network computing device are abnormal or not. If any tasks are determined to be abnormal, the network event remediation service may prevent these tasks from being performed. For instance, if the network event remediation service determines that based on the historical task data that the one or more tasks are being generated with greater frequency that previously observed, the network event remediation service may determine that these one or more tasks are abnormal.

Once the network event remediation service has identified the tasks that may be performed in response to the received event logs, the network event remediation service may prioritize these tasks to ensure that the more important tasks are completed first. As an example, a task whose completion is more likely to solve an issue occurring in multiple computer systems may be prioritized over tasks involving the individual computer systems themselves. As another example, tasks whose performance is automated may be prioritized over tasks involving manual intervention. To prioritize the determined tasks for the network computing devices within the network, the network event remediation service may access these network computing devices to obtain health data, as well other data metrics, to calculate a device score for each network computing device within the network. These device scores may be used to rank the various tasks that may impact the performance or availability of the network computing devices. This ranking of the various tasks may subsequently be used to prioritize the various tasks to be performed on the network computing devices.

The prioritized tasks may be subsequently deployed to the associated network computing devices in order to address any issues presented within the event logs. As these prioritized tasks are performed by the network computing devices, the network event remediation service may evaluate the performance of these tasks to identify any remediation failures within these devices. If the network event remediation service determines that automatic remediation (e.g., remediation performed by the affected network computing device itself) has failed for a particular task, the network event remediation service may obtain the calculated device score for the particular network computing device, as well as other historical data associated with this particular network computing device, to determine whether the particular network computing device is capable of performing other tasks or whether the priority for the failed task needs to be upgraded. This may cause the task to be transmitted to network technicians, which may perform the task manually on the particular network computing device as needed. For instance, if an automatic remediation task is not performed successfully by the target network computing device, the network event remediation service may transmit a manual remediation task to a network technician. This may enable the network technician to address any issues with the network computing device that may be causing the automatic remediation task to fail.

In this manner, the network event remediation service may prioritize and monitor performance of various tasks for network computing devices within a network while preventing performance of any abnormal tasks that may result in unnecessary or otherwise disruptive actions within the network. In addition, the techniques described and suggested herein facilitate additional technical advantages. For example, because, in some embodiments, the network event remediation service is configured to evaluate potential tasks to be performed by the network computing devices to address any issues arising from the received event logs, the network event remediation service may prevent unnecessary tasks to be performed on network computing devices that may divert resources necessary to address more serious issues. This, in turn, may reduce the time required to resolve any issues within the network, restoring functionality and available capacity for use by customers utilizing the network for their needs.

FIG. 1 shows an illustrative example of an environment 100 in which various embodiments can be implemented. In the environment 100, one or more network computing devices 102 operating within a network may be configured to generate and transmit one or more event logs 104 to a network event remediation service 106. The one or more network computing devices 102 may include computer systems, network servers, routers, switches, and other hardware devices that may be utilized for provisioning one or more data storage volumes, providing network connectivity between data storage volumes, and the like. The one or more network computing devices 102 may be organized into one or more hierarchical hardware groupings 102. For instance, a narrow hardware grouping 102 may include one or more server racks having a set of network computing devices 102 that are connected to each other through an aggregation router, such that communications from one server rack to another server rack within the hardware grouping may only require transmitting data through the aggregation router. Alternatively, a narrow hardware grouping may include one or more server racks having a set of network computing devices 102 that share the same network and/or power supply topology. Any devices 102 that are allocated within this narrow hardware grouping may share the same fate (e.g., they may experience a "correlated failure" or "joint failure"). For instance, in the event of a power failure or network failure, the devices 102 allocated within the particular narrow hardware grouping may fail together and share the same fate. Generally, devices 102 associated with one another may be specifically grouped in various ways so that the resources share the same fate upon the occurrence of a failure.

The event logs 104 may include information for each network computing device 102 within the network concerning the performance of the network computing device 102, as well as any issues detected for the device 102. Additionally, each event log 104 may include information usable to identify the corresponding network computing device 102, the hardware grouping for the network computing device 102, the physical location of the network computing device 102, and other information usable by the network event remediation service 106 to determine and prioritize the tasks for the network computing device 102. Each network computing device 102 may generate an event log 104 in response to a triggering event (e.g., issue detected with the device 102, issue detected with another device within the hardware grouping, etc.). Alternatively, each network computing device 102 may generate an event log 104 after a programmed period of time has elapsed.

When the network event remediation service 106 receives the event logs 104 from the various network computing devices 102, the network event remediation service 106 may evaluate these event logs 104 to identify any tasks 108 that are to be performed in response to the events, issues, and other information specified within the event logs 104. For instance, if a communications module of a network computing device 102 fails, the network event remediation service 106 may generate one or more tasks to address this failure. For example, the network event remediation service 106 may generate a task to remove the network computing device 102 from service (e.g., no network traffic will pass to/from the network computing device 102), to place an inventory order for a new module to replace the failed module within the network computing device 102, and to generate a ticket or other work order for network technicians to be deployed to the data center where the device 102 is located to replace the failed module within the network computing device 102.

In an embodiment, the network event remediation service 106 will access a historical task data store to identify any tasks previously performed on the various network computing devices 102. For instance, the network event remediation service 106 may determine, based at least in part on this historical task data, the frequency of tasks being performed by the network computing devices 102, the nature of the tasks performed by the network computing devices 102, and other tasks common to network computing devices 102 that share common device manufacturers, device types, and the like. Based at least in part on this historical task data obtained from the historical task data store, the network event remediation service 106 may determine whether any of the identified tasks to be performed are abnormal (e.g., do not comport with the historical task trends for an associated network computing device, etc.) for the one or more network computing devices 102.

If one or more identified tasks are deemed to be abnormal for a network computing device 102, the network event remediation service 106 may prevent these one or more identified tasks from being performed. For instance, the network event remediation service 106 may discard any abnormal tasks while maintaining any other tasks that need to be performed to restore functionality of the one or more network computing devices 102. Alternatively, the network event remediation service 106 may perform additional evaluation of the affected network computing devices 102 to determine whether the abnormal tasks should be processed or not. The network event remediation service 106, upon separating the abnormal tasks from the identified tasks, may prioritize the remaining identified tasks to cause the network computing devices 102 to perform the various tasks in accordance with this prioritization.

In an embodiment, in order to prioritize the one or more tasks for a particular network computing device 102, the network event remediation service 106 will transmit a request to the network computing device 102 to obtain health data usable to determine the health of the network computing device 102. For instance, this health data may include the network capacity (e.g., bandwidth) available within the part of the network (e.g., data center, server rack, particular hardware grouping, etc.) where the network computing device 102 may be operating, the number of other network computing devices currently online in the part of the network where the network computing device 102 is operating, the number of downed network connections within the part of the network, the network capacity available through operation of the network computing device itself, and the like. This data may be utilized by the network event remediation service 106 to calculate a device score for the network computing device 102, which may be utilized to prioritize the myriad tasks that are to be assigned for the network computing device 102. For example, the device score may be calculated within a range of 0-100, with 100 denoting a healthy network computing device and 0 denoting an unhealthy (e.g., multiple issues associated with the device) network computing device. The device score may be calculated using obtained health data from the various network computing devices 102.

As an illustrative example of how this device score is calculated, the initial score assigned to a particular device may be 100. Each factor concerning the health of the device may be assigned a value within the unit interval (e.g., between 0 and 1), which may be applied to the original score of 100 to obtain a device score. For example, based at least in part on the obtained health data, if there is sufficient available network capacity within the part of the network around the network computing device 102, the network event remediation service 106 may assign a higher score for this factor (e.g., a value closer to 1). Similarly, if the number of other network computing devices online in the same part of the network where the network computing device 102 is located is high, the network event remediation service 106 may assign a higher score for this factor as well. This process may be repeated for the number of downed network connections within this part of the network, with a higher factor score assigned if the number of downed network connections is low. Once the network event remediation service 106 has calculated these factors, the service 106 may obtain an average of these factors to obtain an overall factor that may be applied to the original score of 100. This may result in a device score for the network computing device 102.

As another illustrative example of how the device score may be calculated, the network event remediation service 106 may generate an initial device score based at least in part on various factors. For instance, the network event remediation service 106 may generate one or more factors based at least in part on the latency of communications to/from the network computing device 102, data loss to/from the network computing device 102, the network capacity of network computing devices within the part of the network around the network computing device 102, the number of downed network connections within the part of the network, the number of network computing devices shifted within the part of the network, and the like. Once the network event remediation service 106 determines the initial device score based at least in part on the aforementioned factors, the network event remediation service 106 may multiply this initial device score by an effective capacity utilization factor, which may be based at least in part on network traffic between various network computing devices, including the network computing device 102, within a particular part of the network. The result of this calculation may be the device score utilized to determine what actions should be performed to address any issues with the network computing device 102. An example of an equation that may be used to calculate the device score is illustrated below:

$$\text{Device Score} = \text{Initial Score} \times (\text{capacity factor} + \text{effective utilization})^3$$

where the capacity factor may be a value between 0 and 1 as defined by an administrator of the network event remediation service 106 and/or the network computing devices being evaluated.

In an embodiment, an administrator can generate a score definition file that may be used to determine initial score deductions based at least in part on issues identified through evaluation of the network computing device 102. For instance, the network event remediation service 106 may utilize this score definition file to identify the score deductions for various issues that may result in reduction of the initial device score from 100 to a lower value. An administrator, for example, may specify through use of this score definition file that five points are to be deducted for every downed connection of the network computing device 102, that thirty points are to be deducted if a router connected to the network computing device 102 is not operational, and that twenty points are to be deducted if the latency for the network computing device 102 is above a maximum threshold. It should be noted that this score definition file is fully customizable, enabling the administrator to define score deductions to its preferences or based at least in part on experience in addressing issues associated with the network computing device 102. The network event remediation service 106 may obtain this score definition file from the network computing device 102 itself or may be provided by the administrator upon configuration of the network event remediation service 106.

If the device score is sufficiently low (e.g., below 50), indicating redundancy loss or network computing device 102 service degradation, the network event remediation service 106 may prioritize defined tasks that include dispatching one or more data technicians to the site where the network computing device 102 is located to address any issues associated with the device 102 or any other neighboring devices. Alternatively, if the score is sufficiently high (e.g., over 50), the network event remediation service 106 may prioritize tasks that may enable automatic remediation of any issues through use of the network computing device 102 itself or any other neighboring devices capable of addressing any of the issues identified with regard to the network computing device 102. If the score is determined to be 100, the network event remediation service 106 may not generate any alarms, as the network computing device 102 may be deemed to be healthy. Once the tasks 108 have been prioritized, the network event remediation service 106 may dispatch these defined tasks 108 to each network computing device 110 that is to perform one or more tasks to address any identified issues with regard to the network computing device 110.

In some instances, a network computing device 110 may not receive any tasks 108 from the network event remediation service 106. For example, if the prioritization of the tasks for the particular network computing device 110 results in tasks involving manual data technician support being required, these tasks may be transmitted to the appropriate data technicians or data service center. The network event remediation service 106 may withhold any remaining tasks until the tasks involving these data technicians have been completed. Alternatively, if the network event remediation service 106 determines that the generated tasks for the network computing device 110 are abnormal, the network event remediation service 106 may prevent any of these tasks from being performed. This may include withholding these tasks from the network computing device 110.

In an embodiment, once the tasks 108 have been dispatched to the various network computing devices 110 within the network, the network event remediation service 106 may evaluate the performance of these tasks 108 to determine whether automatic remediation of one or more events has failed for any of the network computing devices 110. If the network event remediation service 106 identifies any failures in performance of the automatic remediation tasks for a network computing device 110, the network event remediation service 106 may obtain the device score and historical task data for the particular network computing device 110 to determine the present capabilities of the network computing device 110 to perform these automatic remediation tasks. For instance, if the device score for the network computing device 110 has decreased, the network event remediation service 106 may upgrade the priority for performance of other tasks necessary to enable the network computing device 110 to perform these automatic remediation tasks 108. Alternatively, if the network event remediation service 106 determines that the device score for the affected network computing device 110 is still high enough to perform automatic remediation tasks, the network event remediation service 106 may upgrade the priority of these failed automatic remediation tasks to cause the network computing device 110 to attempt performance of these tasks 108 once more. If the network event remediation service 106 still determines that these tasks 108 are not being performed successfully, the network event remediation service 106 may generate a new task to dispatch network technicians to identify any issues with the network computing device 110 to address this issue.

Figure 2:
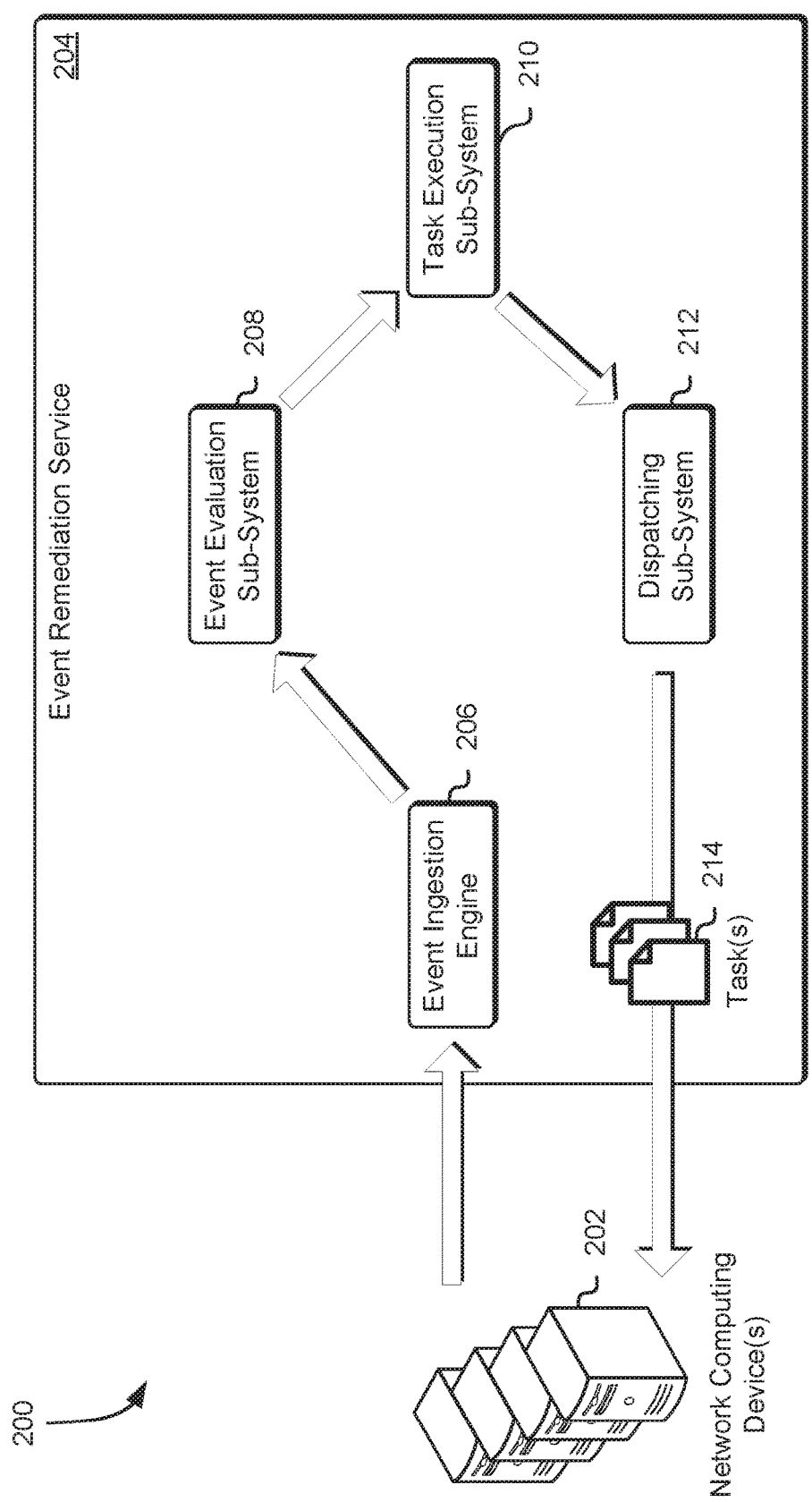
FIG. 2 shows an illustrative example of an environment in which an event remediation service is configured to ingest one or more event logs to generate one or more tasks for various network computing devices within a network according to at least one embodiment.

In some embodiments, the network event remediation service will include various components configured to, among other things, generate tasks based at least in part on event logs received from various network computing devices, prioritize these tasks based on the health of each network computing device, and evaluate the network computing devices to ensure that any assigned tasks are being performed successfully. Accordingly, FIG. 2 shows an illustrative example of an environment 200 in which an event remediation service 204 is configured to ingest one or more event logs to generate one or more tasks 214 for various network computing devices 202 within a network according to at least one embodiment. In the environment 200, one or more network computing devices 202 may be configured to transmit one or more event logs to an event ingestion engine 206 of the network event remediation service 204. An event log for a particular network computing device 202 may specify performance metrics of the network computing device 202 within the network. Additionally, the event log may further specify any issues (e.g., failures, alarms, warnings, etc.) detected for the device 202. Additionally, each event log may include information usable to identify the corresponding network computing device 202, the hardware grouping for the network computing device 202, the physical location of the network computing device 202, and other information usable by the network event remediation service 204 to determine and prioritize the tasks for the network computing device 202.

The network event remediation service 204 may include an event ingestion engine 206, which may be a module executing on a computer system configured to obtain event logs from various network computing devices 202. The event ingestion engine 206, upon receiving the various event logs from the network computing devices 202, may categorize the various event logs based at least in part on the network computing device 202 providing the event logs, the hardware types for the network computing devices 202, the location of the network computing devices 202, and the like. The event ingestion engine 206 may also receive various event logs from alternative sources within the network, including network technicians through manual entry and other network components and devices (e.g., network monitoring systems, routers, etc.). Once the event ingestion engine 206 has obtained the various event logs and has categorized them based at least in part on certain criteria (e.g., network computing device identifiers, hardware, location, etc.), the event ingestion engine may provide these event logs to an event evaluation sub-system 208, which may comprise one or more computer systems collectively configured to generate various tasks based at least in part on the obtained event logs from the event ingestion engine 206. Thus, the event evaluation sub-system 208 may utilize these event logs to generate one or more tasks to be performed by the various network computing devices 202 in order to address any issues presented through the event logs.

The event evaluation sub-system 208 may be configured by network technicians and other technicians to generate various tasks based at least in part on the issues presented within the one or more event logs provided by the event ingestion engine 206. For instance, network technicians may program the event evaluation sub-system 208 to generate various tasks based at least on solutions to known issues utilized by these technicians over time to resolve these known issues. These tasks may include automatic remediation techniques that may be performed by the affected network computing device 202 and/or other devices within the network that may be utilized to address the issues presented through the event logs. Additionally, or alternatively, the event evaluation sub-system 208 may be programmed to utilize one or more machine learning techniques, such as supervised learning techniques, to determine the appropriate task to be performed in response to a particular issue identified within the one or more event logs. For instance, a machine learning algorithm may, at any time, utilize one or more sample vectors to perform one or more simulations to determine whether the functions utilized by the event evaluation sub-system 208 are producing tasks to resolve the identified issue and/or to refine the one or more functions utilized by the event evaluation sub-system 208 to produce tasks necessary to resolve the identified issue. For instance, during initialization of the machine learning algorithm, the network technicians may provide the machine learning algorithm with one or more sample vectors and analytical results (e.g., desired outcomes or tasks) that should be obtained based at least in part on these one or more sample vectors. Accordingly, the machine learning algorithm, based at least in part on this exercise, may adjust the functions utilized by the event evaluation sub-system 208 to analyze the event logs obtained from the event ingestion engine 206.

The machine learning algorithm may receive input from one or more network technicians employed by a service provider to analyze the tasks generated by the event evaluation sub-system 208 through use of the one or more functions described above. For instance, a data technician may review the generated tasks, the success rate in resolving the issues presented through performance of the generated tasks, and the efficiency in resolving the issues utilizing the generated tasks to determine whether the event evaluation sub-system 208 is generating the appropriate tasks to resolve any issues presented through the event logs. The network technician may provide his/her input for use in refining a function used to classify vector input as corresponding to appropriate or inappropriate tasks. The vector of measurements corresponding to the review performed by the network technician and the desired outcome corresponding to the analyst's input may be used by the machine learning algorithm to update the function used to classify vector inputs. Such may be performed by multiple network technicians and/or using multiple vector inputs to provide the machine learning algorithm a sufficient number of sample vector inputs and desired outputs. Accordingly, the machine learning algorithm may adjust the one or more functions used by the event evaluation sub-system 208 to increase the likelihood that the desired task is generated in response to future event log evaluations. The function used to classify measurement vectors may vary in accordance with various embodiments. For example, in some embodiments, support vector machine techniques are used to classify regions in Euclidean space as appropriate or inappropriate (e.g., higher probability of success may be deemed appropriate, etc.) so that tasks are classified in accordance with the region in which the task vectors fall.

Once the event evaluation sub-system 208 has evaluated the ingested event logs and has generated one or more tasks to be performed by the network computing devices 202, the event evaluation sub-system 208 may transmit these generated tasks to a task execution sub-system 210. The task execution sub-system 210 may include one or more computer systems of the network event remediation service 204 configured to evaluate the generated tasks to determine whether any of the generated tasks are abnormal and should not be performed by the one or more network computing devices. For instance, as will be described in greater detail below, the task execution sub-system 210 may access a historical task data store to obtain historical data for the various network data devices 202 within the network. This historical data may be used to identify previous tasks performed for these various network data devices 202 and to identify any trends with regard to these previously performed tasks. The task execution sub-system 210 may utilize these trends to determine whether the tasks generated by the event evaluation sub-system are abnormal and do not comport with previously performed tasks. If the task execution sub-system 210 determines that a generated task is abnormal for a particular network computing device 202, the task execution sub-system 210 may prevent execution of the generated task. This may include discarding the generated task or performing additional evaluation of the affected network computing devices 202 to determine whether the abnormal tasks should be processed.

The task execution sub-system 210 may further prioritize any tasks that are to be transmitted to the one or more network computing devices 202. In an embodiment, the task execution sub-system 210 will transmit a request to the various network computing devices 202 to obtain device data for each of these devices 202. The task execution sub-system 210 may utilize this device data to determine the health of the network computing devices 202. For instance, as noted above, this data may include the network capacity available within the part of the network where the network computing devices 202 may be operating, the number of other network computing devices currently online in the part of the network where the network computing devices 202 are operating, the number of downed network connections within the relevant part of the network, and the like. This data may be utilized by the task execution sub-system to calculate a device score for each network computing device 202, which may be utilized to prioritize the myriad tasks that are to be assigned for each network computing device 202.

Upon removing any abnormal tasks and prioritizing any remaining tasks for the network computing devices 202, the task execution sub-system 210 may transmit these remaining tasks to a dispatching sub-system 212. The dispatching sub-system 212 may include one or more computer systems connected to other systems in the network, including the network computing devices 202, network technician dispatch services, and other services and systems, for transmitting one or more tasks to these services and systems. The dispatching sub-system 212 may be configured to transmit the received tasks 214 to the corresponding network computing devices 202, which may receive these tasks 214 and perform one or more operations in accordance with the tasks 214 provided by the dispatching sub-system 212. In an embodiment, the dispatching sub-system 212 will evaluate the performance of the provided tasks 214 by the network computing devices 202 to determine whether the provided tasks 214 have been performed successfully. If the dispatching sub-system 212 determines that a task provided to a network computing device has not been performed successfully, the dispatching sub-system 212 may transmit a request to the task execution sub-system 210 to obtain an updated device score and the historical task data for the affected network computing device. This updated device score and historical data may enable the dispatching sub-system 212 to determine whether a particular task needs to be performed manually by a network technician or other entity capable of addressing the issue to be resolved through execution of the task. Alternatively, the updated device score and historical data, if indicative of the network computing device being able to automatically remediate the pertinent issue to be addressed, may upgrade the priority for the failed remediation task 214 in order to enable the network computing device to attempt performance of the task 214. This may enable the network event remediation service 204 to determine whether there are additional issues with the network computing device that may need to be addressed through an alternative remediation task or through manual remediation by one or more network technicians.

Figure 3:
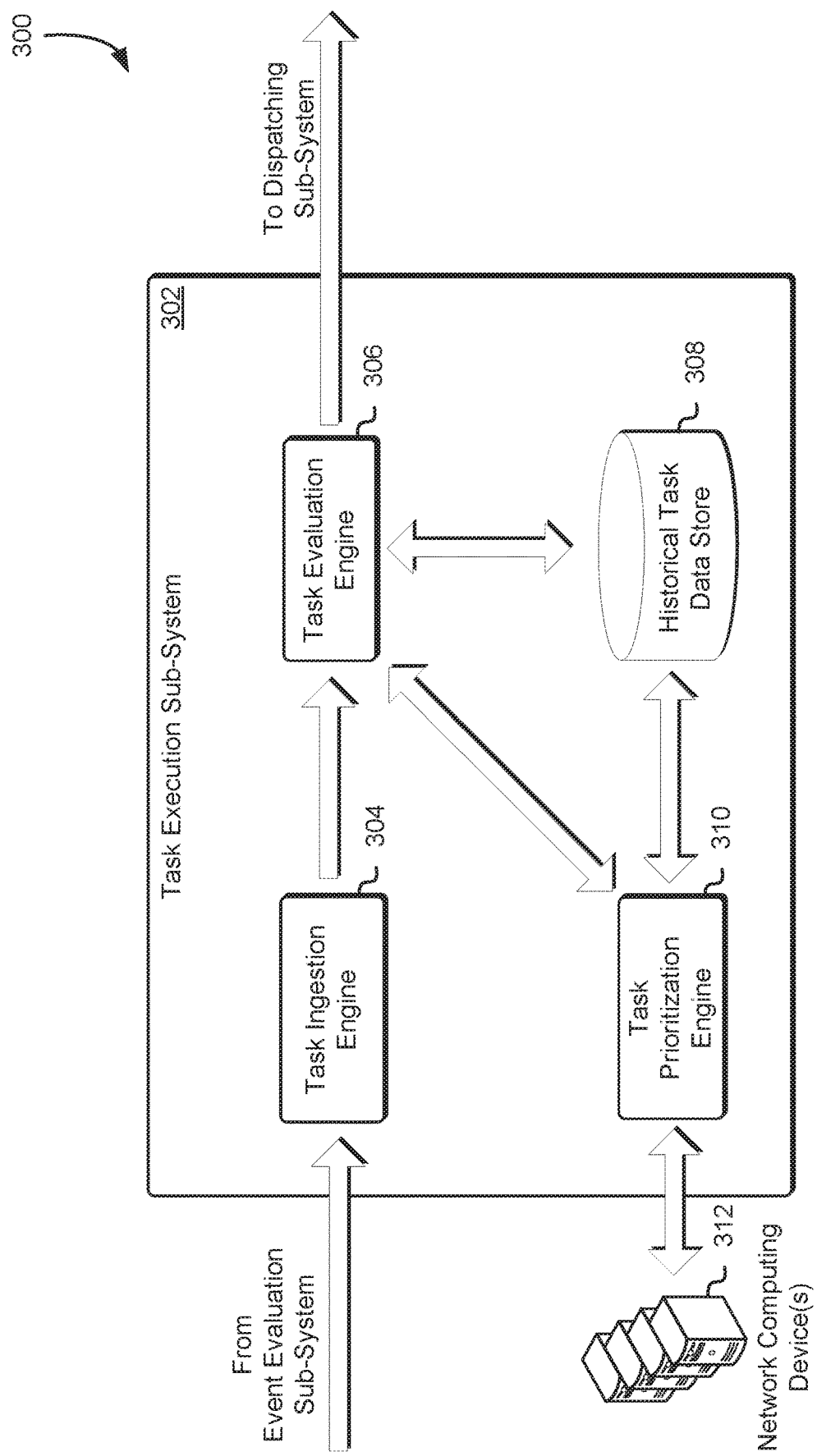
FIG. 3 shows an illustrative example of an environment in which a task execution sub-system of an event remediation service aggregates and evaluates tasks destined for one or more network computing devices in accordance with at least one embodiment.

As noted above, the network event remediation service may include a task execution sub-system configured to prevent performance of any abnormal tasks and to prioritize any tasks that are to be dispatched to the various network computing devices within the network. Accordingly, FIG. 3 shows an illustrative example of an environment 300 in which a task execution sub-system 302 of an event remediation service aggregates and evaluates tasks destined for one or more network computing devices 312 in accordance with at least one embodiment. In the environment 300, the task execution sub-system 302, through a task ingestion engine 304, may receive myriad tasks generated by the event evaluation sub-system, as described above. The task ingestion engine 304 may be a module of the task execution sub-system 302 configured to obtain the various tasks generated by the event evaluation sub-system. The myriad tasks received by the task ingestion engine 304 may be sorted based at least in part on the target network computing device, the hardware utilized by different network computing devices, the actions specified within the tasks, the location of the target network computing devices, and the like. Alternatively, the task ingestion engine 304 may sort these received tasks if the tasks were not previously sorted by the event evaluation sub-system.

The task ingestion engine, upon receiving the myriad tasks and ensuring that the received tasks have been sorted based at least in part on one or more criteria, may transmit these requests to a task evaluation engine 306. The task evaluation engine 306 may include one or more modules and computer systems configured to determine whether any of the received tasks are abnormal for each target network computing device. In order to make this determination for a particular network computing device, the task evaluation engine 306 may access a historical task data store 308 to evaluate any tasks previously performed by the particular network computing device. This may include analyzing the specific actions performed by the network computing device, the frequency of these actions, and the circumstances surrounding the creation of the task (e.g., communications module failure, loss of network bandwidth capacity, etc.). If the task evaluation engine 306 determines, based at least in part on an evaluation of any historical tasks performed by the target network computing device, that a particular task is abnormal, the task evaluation engine 306 may prevent this particular task from being performed by the target network computing device. For instance, the task evaluation engine 306 may prevent the task from being transmitted to the dispatching sub-system for delivery to the target network computing device.

Once the task evaluation engine 306 has removed any abnormal tasks from the myriad tasks to be dispatched to the network computing devices 312, the task evaluation engine 306 may transmit a request to a task prioritization engine 310 to determine how the remaining tasks are to be prioritized for each network computing device within the network. The task prioritization engine 310 may include one or more modules configured to interact with the network computing devices 312 to obtain device data usable to determine the health of each of these devices. For instance, in response to the request from the task evaluation engine 306, the task prioritization engine 310 may obtain, from each network computing device 312, various health metrics, as well as other metrics (e.g., temperature, vibration, etc.) that may be used to calculate a device score for each device 312. For example, the device score may be calculated within a range of 0-100, with 100 denoting a healthy network computing device and 0 denoting an unhealthy (e.g., multiple issues associated with the device) network computing device.

If the device score is sufficiently low (e.g., under 50) for a particular network computing device, the task prioritization engine 310 may sort tasks for this device such that tasks that would result in one or more data technicians being dispatched to the site where the network computing device is located to address any issues associated with the device may be performed first. Alternatively, if the score is sufficiently high (e.g., over 50) for a particular network computing device, the task prioritization engine 310 may prioritize tasks that may enable automatic remediation of any issues through use of the network computing device itself or any other neighboring devices capable of addressing any of the issues identified with regard to the network computing device. Once the tasks have been prioritized, the task prioritization engine 310 may provide the prioritized tasks for each network computing device to the task evaluation engine 306, which may transmit these prioritized tasks to the dispatching sub-system of the network event remediation engine. This may cause the dispatching sub-system to transmit these tasks to each of the network computing devices 312 and enable performance of the tasks to address any issues identified by these devices 312.

Figure 4:
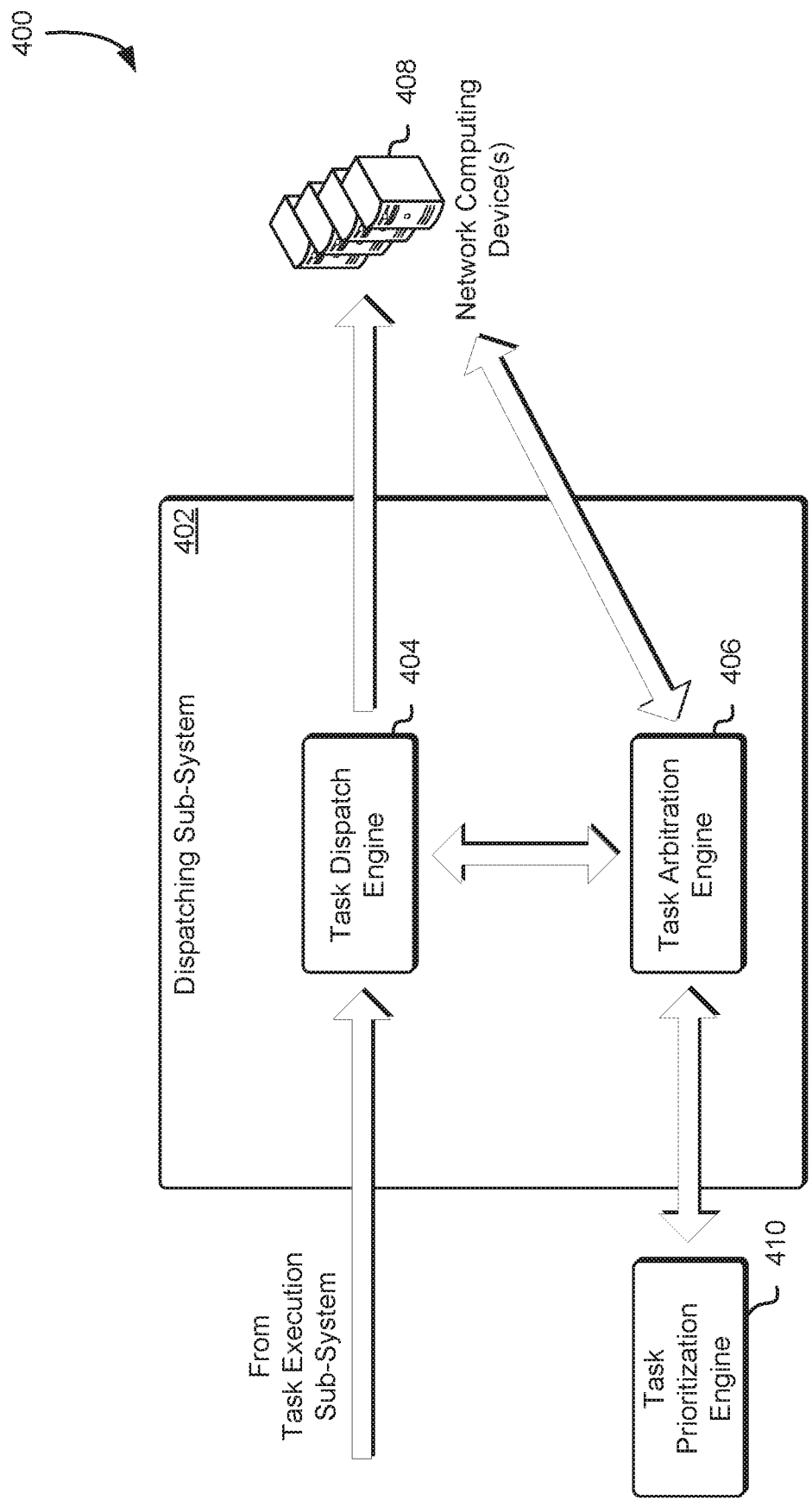
FIG. 4 shows an illustrative example of an environment in which a dispatching sub-system of an event remediation service dispatches tasks to network computing devices and arbitrates any tasks that may have failed during the automatic remediation in accordance with at least one embodiment.

As noted above, the network event remediation service may include a dispatching sub-system configured to dispatch tasks to the network computing devices and to evaluate performance of these tasks to identify any failure by these network computing devices to perform automatic remediation of any issues through execution of the provided tasks. Accordingly, FIG. 4 shows an illustrative example of an environment 400 in which a dispatching sub-system 402 of an event remediation service dispatches tasks to network computing devices 408 and arbitrates any tasks that may have failed during the automatic remediation process in accordance with at least one embodiment. In the environment 400, the dispatching sub-system 402, through a task dispatch engine 404, may receive the prioritized tasks from the task execution sub-system. The task dispatch engine 404 may be a module or computer system configured to determine which tasks are to be dispatched to each network computing device 408, as well as any other entities that may be required to perform any tasks associated with any of the network computing devices 408 within the network. For instance, if a task is to be performed by one or more network technicians, the task dispatch engine 404 may transmit this task to a separate technician dispatch service, which may be configured to transmit the task to a network technician that may perform the actions specified within the provided task.

Once the one or more tasks have been dispatched to the various network computing devices 408 within the network, a task arbitration engine 406 may evaluate these network computing devices 408 to determine whether automatic remediation of an issue by a network computing device has failed. The task arbitration engine 406 may include one or more modules and computer systems configured to determine whether an automatic remediation task has failed and, if so, determine whether other tasks should be performed to address any issues with corresponding network computing devices. For instance, if a task that has been dispatched to a network computing device has not been performed successfully by the network computing device, the task arbitration engine 406 may determine that automatic remediation of the issue has failed, as the task may have been created to address the discovered issue. The task arbitration engine 406, upon discovering that an automatic remediation task has not been performed successfully, may transmit a request to the task prioritization engine 410 of the task execution sub-system to obtain an updated device score for the affected network computing device.

Based at least in part on this updated device score, the task arbitration engine 406 may determine the capabilities of the network computing device to perform the task in question (e.g., failed automatic remediation task). For instance, if the updated device score is lower than the original device score utilized to prioritize the task, the task arbitration engine 406 may downgrade the priority for the automatic remediation task while upgrading any tasks that may require manual remediation by one or more network technicians. This may enable these network technicians to address any issues preventing successful performance of the automatic remediation task. Alternatively, if the updated device score is greater than or equal to the originally calculated device score, the task arbitration engine 406 may upgrade the priority for the automatic remediation task, causing this task to be dispatched again to the affected network computing device. This may enable the task arbitration engine 406 to continue evaluating the device to determine whether performance of the automatic remediation task is completed successfully. If further failures occur, the task arbitration engine 406 may generate a task to dispatch network technicians to the affected device to address one or more issues preventing performance of the automatic remediation task.

As noted above, the network event remediation service may be configured to obtain event logs from various network computing devices in order to identify issues associated with these devices and generate tasks to address these issues. Additionally, the network event remediation service may prevent any abnormal tasks from being performed while prioritizing other tasks to ensure that remediation of particular issues is performed in a manner that does not negatively impact the performance of the network computing devices and/or the network itself.

Figure 5:
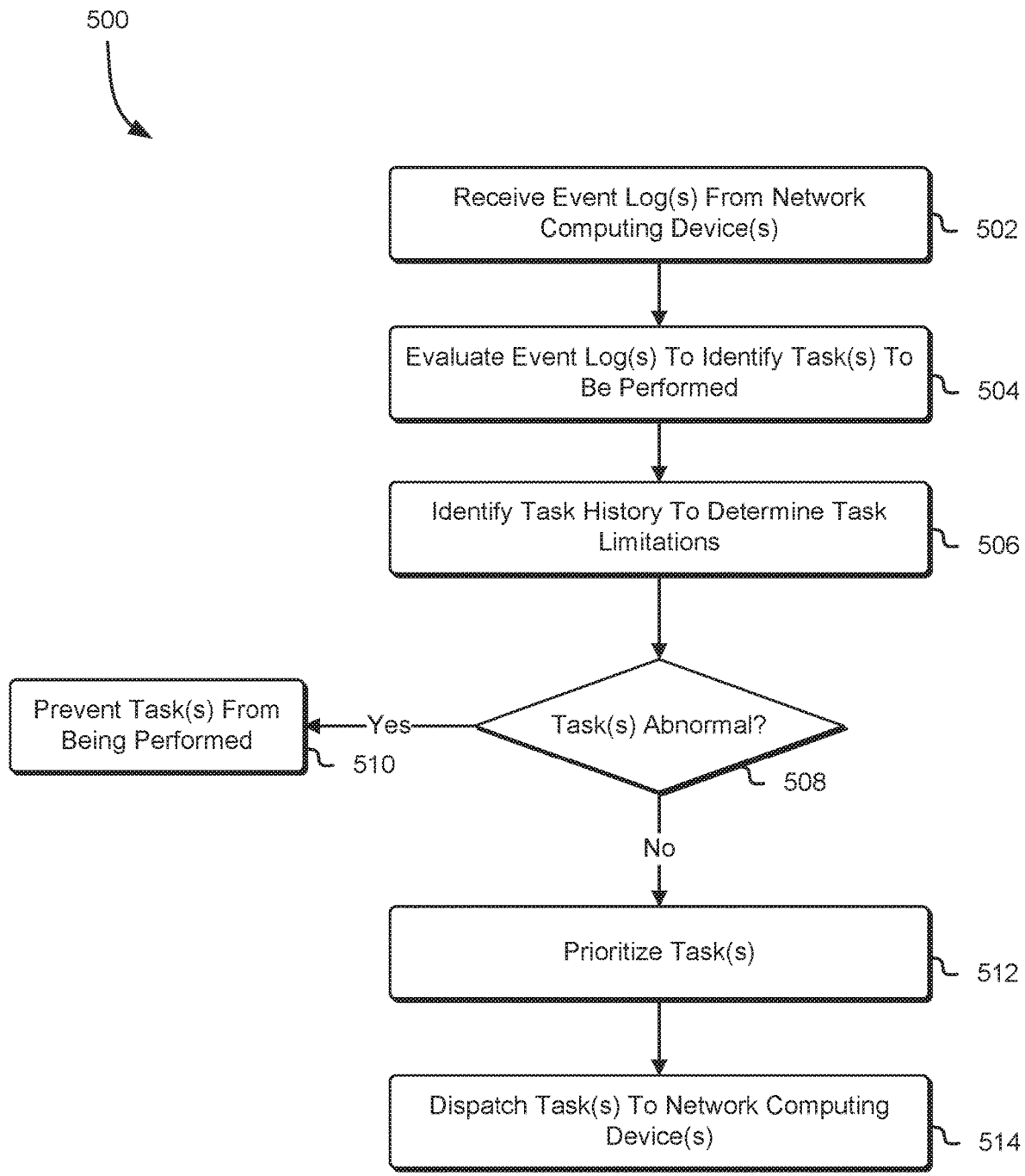
FIG. 5 shows an illustrative example of a process for generating and dispatching one or more tasks to network computing devices based at least in part on event logs received from the network computing devices in accordance with at least one embodiment.

Accordingly, FIG. 5 shows an illustrative example of a process 500 for generating and dispatching one or more tasks to network computing devices based at least in part on event logs received from the network computing devices in accordance with at least one embodiment. The process 500 may be performed by the aforementioned network event remediation service, which may be configured to receive event logs from the network computing devices, generate tasks based at least in part on these logs, and dispatch any generated tasks to the network computing devices and/or other entities for remediation of various discovered issues.

Each network computing device within the network may be configured to record various events and/or issues within event logs, which may be transmitted to the network event remediation service. An event log may specify an identifier for the associated network computing device, a code or other descriptor of each event detected by the network computing device, the hardware configuration of the network computing device, the physical location of the network computing device, the logistical location of the device within the network hierarchy, and the like. The network computing device may be configured to transmit the event log to the network event remediation service in response to a triggering event. For instance, if the network computing device detects an event that has resulted in reduction of the network computing device functionality within the network, the network computing device may record this event within the event log and transmit the event log to the network event remediation service. Alternatively, the network computing device may transmit the event log to the network event remediation service after a programmed period of time has elapsed. For instance, the network computing device may be configured to provide an event log every minute, every hour, every five hours, etc. In this manner, the network event remediation service may receive 502 one or more event logs from one or more network computing devices.

Once the network event remediation service has obtained the one or more event logs from the network computing devices, the network event remediation service may evaluate 504 these event logs to identify any tasks that are to be performed to address any issues arising from the event specified in the event logs. The network event remediation service may utilize a repository of tasks configured to address any of the presented issues to select the various tasks that are to be performed. This repository of tasks may be generated by one or more network technicians, who may utilize their experience performing remediation tasks within the network to address network computing device issues to define the tasks that need to be performed to address myriad issues that may arise.

In an alternative embodiment, the network event remediation service may be configured to utilize one or more machine learning techniques, such as supervised learning techniques, to determine the appropriate task to be performed in response to a particular issue identified within the one or more event logs. For instance, a machine learning algorithm may, at any time, utilize one or more sample vectors to perform one or more simulations to determine whether the functions utilized by network event remediation service are producing tasks to resolve the identified issue and/or to refine the one or more functions utilized by the network event remediation service to produce tasks necessary to resolve the identified issue. For instance, during initialization of the machine learning algorithm, the network technicians may provide the machine learning algorithm with one or more sample vectors and analytical results (e.g., desired outcomes or tasks) that should be obtained based at least in part on these one or more sample vectors. Accordingly, the machine learning algorithm, based at least in part on this exercise, may adjust the functions utilized by the network event remediation service to analyze the event logs obtained from the network computing devices.

The network event remediation service may identify 606 the task history for the one or more network computing devices to determine any task limitations that should be considered before dispatching the generated tasks to the one or more network computing devices. For instance, the network event remediation service may access a historical task data store to identify the historical task data for each network computing device. This historical task data may specify the tasks previously performed by the network computing device (e.g., automatic remediation tasks) and tasks previously performed by network technicians on the network computing device (e.g., manual remediation tasks). Further, this historical task data may specify the frequency in which these tasks were previously performed. This may enable the network event remediation service to determine 508 whether the tasks generated to address the present issues for a particular network computing device are abnormal. For instance, tasks generated may be abnormal if they have not previously been performed by the network computing device. Alternatively, a task may be abnormal if the generated tasks are to be performed in a frequency that is inconsistent with previously performed tasks. The network event remediation service may determine that the tasks generated are abnormal based at least in part on the number of tasks generated. For instance, if the network event remediation service determines, based at least in part on the task history, that the number of generated tasks is too high for the network computing device, the network event remediation service may determine that these tasks are abnormal.

If the network event remediation service determines that one or more tasks are abnormal for a particular network computing device, the network event remediation service may prevent 510 these one or more tasks from being performed. For instance, the network event remediation service may prevent these one or more tasks from being dispatched to the corresponding network computing devices. Alternatively, the network event remediation service may discard these abnormal tasks. In some embodiments, if tasks are deemed to be abnormal, the network event remediation service may evaluate the nature of these abnormal tasks to determine whether manual remediation of one or more issues is required to prevent further generation of these abnormal tasks. For instance, in the event of a power outage in a data center, whereby the network computing devices within this data center may generate various events, the network event remediation service may generate various automatic remediation tasks that may only compound the present issues by absorbing available bandwidth without addressing the underlying cause of these issues. Thus, the network event remediation service, upon deeming these automatic remediation tasks to be abnormal, may generate a manual remediation task that may be performed by a network technician on site. This may enable this network technician to address the underlying issue (e.g., power outage). If the one or more tasks are abnormal due to a significant number of tasks being generated above a normal number of tasks, as specified in the task history, the network event remediation service may remove a number of these generated tasks.

Once the network event remediation service has removed any abnormal tasks, the network event remediation service may prioritize 512 any tasks to enable the network computing devices to perform more important tasks first before addressing any other minor issues that may actually be resolved through performance of the more important tasks. In order to prioritize these tasks, the network event remediation service may transmit a request to the network computing devices to obtain data usable to determine the health of each network computing device. For instance, this data may include the network capacity (e.g., bandwidth) available within the part of the network (e.g., data center, server rack, particular hardware grouping, etc.) where the network computing device may be operating, the number of other network computing devices currently online in the part of the network where the network computing device is operating, the number of downed network connections within the part of the network, and the like. This data may be utilized by the network event remediation service to calculate a device score for each network computing device, which may be utilized to prioritize the myriad tasks that are to be assigned for each network computing device.

If the device score is sufficiently low, the network event remediation service may prioritize defined tasks that include dispatching one or more data technicians to the site where the network computing device is located to address any issues associated with the device or any other neighboring devices. Alternatively, if the score is sufficiently high, the network event remediation service may prioritize tasks that may enable automatic remediation of any issues through use of the network computing device itself or any other neighboring devices capable of addressing any of the issues identified with regard to the network computing device. Once the tasks have been prioritized, the network event remediation service may dispatch 514 these defined tasks to each network computing device that is to perform one or more tasks to address any identified issues with regard to the network computing device.

Figure 6:
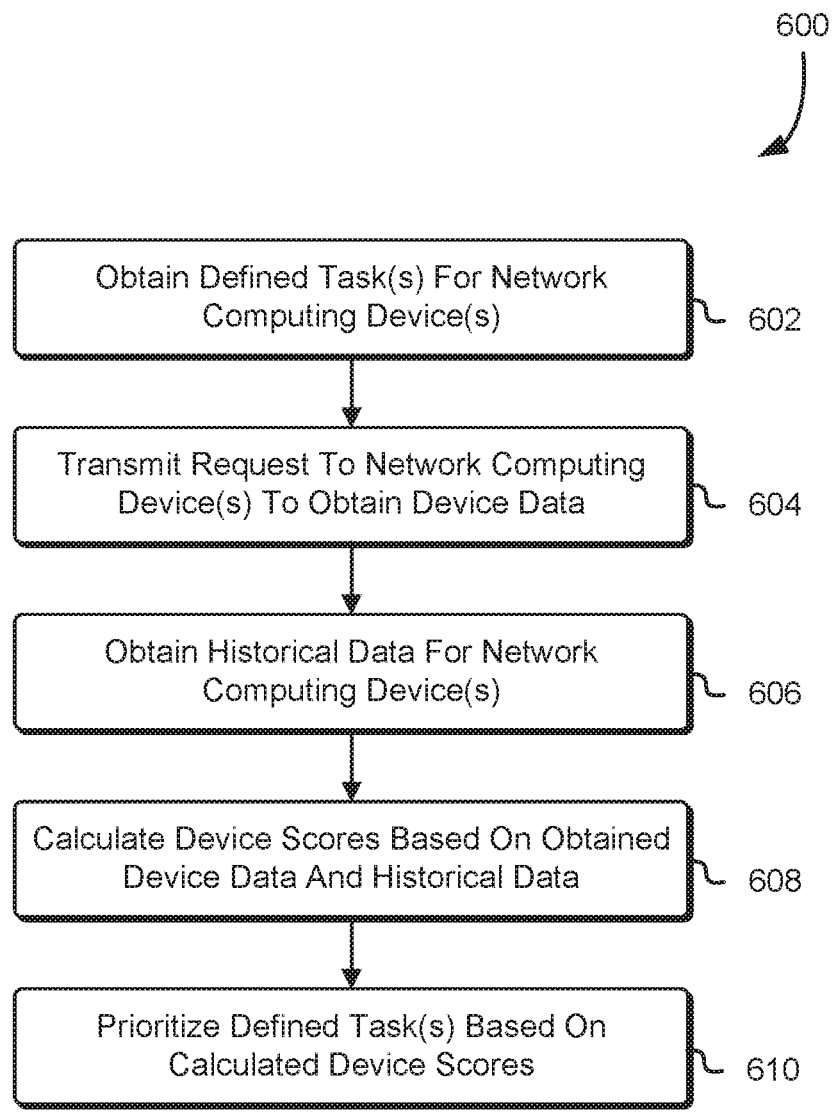
FIG. 6 shows an illustrative example of a process for prioritizing generated tasks for one or more network computing devices in accordance with at least one embodiment.

As noted above, the network event remediation service may include, within a task execution sub-system, a task prioritization engine configured to utilize network computing device health data obtained from each network computing device of the network to calculate a device score and prioritize the tasks to be dispatch to each of these network computing devices. Accordingly, FIG. 6 shows an illustrative example of a process 600 for prioritizing generated tasks for one or more network computing devices in accordance with at least one embodiment. The process 600 may be performed by the aforementioned task prioritization engine, which may be configured to transmit requests to network computing devices within the network to obtain device health data usable to calculate a device score for each network computing device. Further, the task prioritization engine may be configured to access a historical task data store to provide further input to the algorithms used to calculate this device score.

When the task evaluation engine of the task execution sub-system evaluates the various tasks obtained from the task ingestion engine, the task evaluation engine may determine whether any of these received tasks are abnormal. If any of these tasks are deemed to be abnormal, the task evaluation engine may prevent execution of these abnormal tasks by preventing these tasks from being dispatched to the network computing devices and/or discarding these abnormal tasks. The task evaluation engine may transmit any remaining tasks to the task prioritization engine, which may prioritize these tasks based at least in part on criteria specified below. Thus, the task prioritization engine may obtain 602 one or more defined tasks from the task evaluation engine for various network computing devices in the network.

Once the task prioritization engine has obtained various tasks from the task evaluation engine, the task prioritization engine may identify the target network computing devices that are to be receiving these tasks and transmit 604 a request to these target network computing devices to obtain device data for each target device. This device data may be utilized to determine the health of each network computing device. For instance, this data may include the network capacity (e.g., bandwidth) available within the part of the network (e.g., data center, server rack, particular hardware grouping, etc.) where the network computing device may be operating, the number of other network computing devices currently online in the part of the network where the network computing device is operating, the number of downed network connections within the part of the network, the number of downed communications ports and/or modules within the network computing device, the latency of communications to/from the network computing device, data loss to/from the network computing device, the number of network computing devices shifted within the part of the network, and the like. The obtained data may further specify the present configuration of the network computing device, as well as any other devices within the vicinity of the network computing device (e.g., data center, server rack, etc.).

In addition to obtaining data from the network computing devices within the network, the task prioritization engine may further obtain 606 historical task data for each network computing device from either the historical task data store directly or from the task evaluation engine. The task prioritization engine may utilize the historical task data for each network computing device to determine the previous priority assigned to each task performed by a network computing device. This may enable the task prioritization engine to utilize this information as a factor when determining the priority for any current tasks to be dispatched to the various network computing devices.

Once the task prioritization engine has obtained the device data from the network computing devices and the historical task data from either the historical task data store or the task evaluation engine, the task prioritization engine may calculate 608 device scores for each network computing device based at least in part on the device data and historical task data. In an embodiment, the task prioritization engine will calculate a device score within a range of 0-100 for each network computing device, with 100 denoting a healthy network computing device and 0 denoting an unhealthy (e.g., multiple issues associated with the device) network computing device. As noted above, the initial score assigned to a particular device may be 100 (e.g., maximum possible score). Each factor concerning the health of the device may be assigned a value within the unit interval (e.g., between 0 and 1), which may be applied to the original score of 100 to obtain a device score. For example, if there is sufficient available network capacity within the part of the network around the network computing device, the task prioritization engine may assign a higher score for this factor (e.g., a value closer to 1). Similarly, if the number of other network computing devices online in the same part of the network where the network computing device is located is high, the task prioritization engine may assign a higher score for this factor as well. This process may be repeated for the number of downed network connections within this part of the network, with a higher factor score assigned if the number of downed network connections is low. Once the task prioritization engine has calculated these factors, the task prioritization may use these factors to calculate a device score for the network computing device.

Based at least in part on these calculated device scores, the task prioritization engine may prioritize 610 the defined tasks for each of the network computing devices. For instance, if the device score is sufficiently low for a particular network computing device, the task prioritization engine may prioritize the tasks for this device such that tasks that require manual remediation by one or more network technicians may be performed first. Alternatively, if the score is sufficiently high for a particular network computing device, the task prioritization engine may prioritize tasks that may enable automatic remediation of any issues through use of the network computing device itself or any other neighboring devices capable of addressing any of the issues identified with regard to the network computing device. Once the tasks have been prioritized, the task prioritization engine may provide the prioritized tasks for each network computing device to the task evaluation engine, which may transmit these prioritized tasks to the dispatching sub-system of the network event remediation engine.

Figure 7:
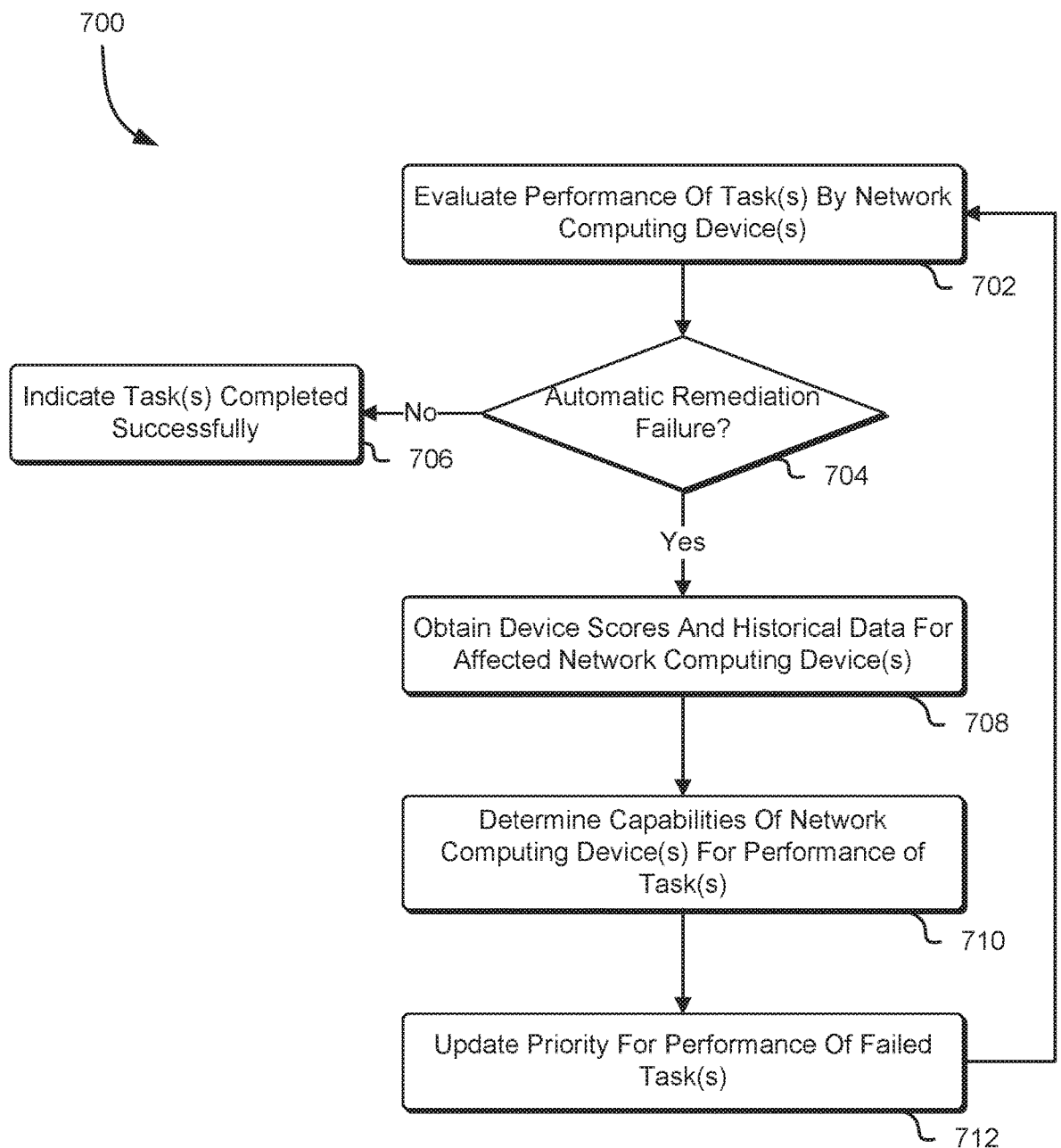
FIG. 7 shows an illustrative example of a process for evaluating performance of tasks by one or more network devices and updating the priority for any failed tasks in accordance with at least one embodiment.

As noted above, the network event remediation service may include a task arbitration engine within a dispatching sub-system configured to determine whether any tasks dispatched to network computing devices have not been completed successfully through automatic remediation techniques. If any tasks have not been performed successfully, the task arbitration engine may determine whether other tasks may be performed that may address any identified issues for the affected network computing device. Accordingly, FIG. 7 shows an illustrative example of a process 700 for evaluating performance of tasks by one or more network computing devices and updating the priority for any failed tasks in accordance with at least one embodiment. The process 700 may be performed by the aforementioned task arbitration engine, which may be configured to monitor the various network computing devices within the network to evaluate performance of the dispatched tasks. Further, the task arbitration engine may also be configured to transmit requests to the task prioritization engine of the task execution sub-system to obtain updated device scores for the various network computing devices for updating the priority of the various tasks for each network computing device that has failed to successfully complete at least one task.

In an embodiment, the task arbitration engine will evaluate 702 performance of the one or more tasks dispatched to each network computing device to determine 704 whether automatic remediation of one or more issues has failed. For instance, a task may specify one or more operations that may be performed by a network computing device to address one or more issues presented within the event logs provided to the network event remediation service. These tasks may cause the network computing devices to perform automatic remediation of the issues identified from the event logs. The task arbitration engine, through evaluation of these network computing devices, may detect failure of any tasks within these network computing devices. Alternatively, each network computing device may be configured to transmit a notification to the task arbitration engine to indicate that the device has failed to perform the dispatched task. This notification may specify one or more error codes that may be used by the task arbitration engine to determine the nature of the task failure, which may be utilized to determine how to address the task failure, as described below.

If the task arbitration engine determines that one or more tasks have been performed successfully, thus indicating that automatic remediation of a particular issue has not failed, the task arbitration engine may indicate 706 that the one or more tasks have been completed successfully. For instance, the task arbitration engine may access a task completion log maintained by the network event remediation service to update entries for the one or more tasks to indicate that these tasks have been completed successfully. Alternatively, the task arbitration engine may transmit a report to the network technicians to indicate successful completion of the automatic remediation tasks. However, if the task arbitration engine determines that one or more automatic remediation tasks have not been performed successfully, the task arbitration engine may transmit a request to the task prioritization engine to obtain 708 updated device scores for the affected network computing devices. Additionally, the task arbitration engine may obtain the historical task data for the affected network computing devices from the historical task data store.

Based at least in part on the updated device scores and the historical task data for the affected network computing devices, the task arbitration engine may determine 710 the current capabilities of the affected network computing devices. For instance, the task arbitration engine may compare the newly calculated device score for a particular network computing device to the previous device score to determine whether the device score has changed. For example, if the new device score is lower than the previously calculated network device score, the task arbitration engine may determine that manual remediation tasks may need to be performed in order to address any present issues with the affected network computing device. Alternatively, if the device score is greater than or equal to the previously calculated device score for an affected network computing device, the task arbitration engine may determine that one or more automatic remediation tasks should be successfully performed by the affected network computing device. Additionally, the historical task data may enable the task arbitration engine to determine common tasks performed by any affected network computing devices over time, which may be useful in identifying tasks that may be successfully performed by these network computing devices.

Once the task arbitration engine has determined the present capabilities of the affected network computing devices based at least in part on the obtained device scores and the historical task data for these affected network computing devices, the task arbitration engine may update 712 the priority for performance of the failed one or more automatic remediation tasks, as well as any other tasks to be performed by the network computing devices. For instance, if the new device score is lower than previously calculated, the task arbitration engine may update the priority of the failed remediation task such that the failed remediation task may be performed after any manual remediation tasks assigned to the affected network computing device. This may enable network technicians to manually resolve any issues with the affected network computing device, which may cause the device to be capable of performing the failed remediation tasks. Alternatively, if the updated device score is greater than or equal to the previously calculated device score, the task arbitration engine may update the priority of these failed automatic remediation tasks to cause the affected network computing device to attempt performance of these tasks once more. If the task arbitration engine still determines that these tasks are not being performed successfully, the task arbitration engine may generate a new task to dispatch network technicians to identify any issues with the network computing device to address this issue.

Figure 8:
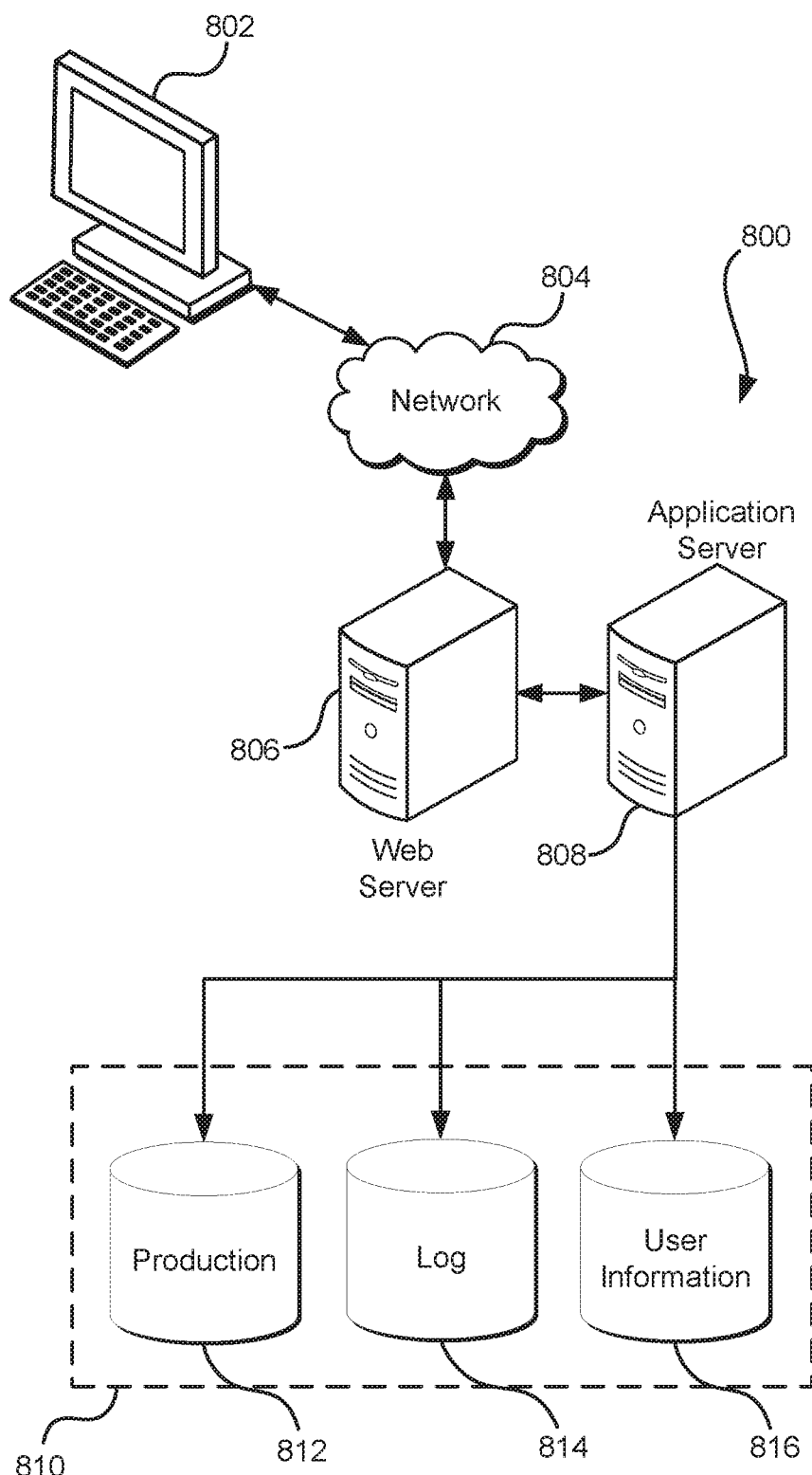
FIG. 8 shows an illustrative example of an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method, comprising:
   receiving an event log from a first network switch indicating an issue with the network switch, wherein the first network switch is in a network;
   transmitting requests for health data to other network switches within the network wherein the first network switch is located;
   receiving the health data from the other network switches;
   calculating a score for the first network switch using the health data of the other network switches, wherein the health data from the other network switches is used to determine a number of the other network switches currently online in the network wherein the first network switch is located and using the number of the other network switches currently online in calculating the score for the first network switch; and
   based on the score of the first network switch, prioritizing tasks to be performed in the network.

2. The method of claim 1, further including receiving historical task data for the first network switch and determining if the event log is abnormal relative to the historical task data and ignoring the event log if it is abnormal.

3. The method of claim 1, further including receiving task data related to a frequency of tasks being performed by the other network switches and determining that the event log is abnormal if the frequency of the tasks is greater than previously observed.

4. The method of claim 1, further including receiving information related to manufacturers of the other network switches and the first network switch and using the received information related to the manufactures in the calculation of the score.

5. The method of claim 1, wherein the network includes a data center, and wherein the health data from the other network switches is used to determine a capacity of the network in the data center and using the capacity of the network in calculating the score.

6. One or more computer-readable device comprising computer-executable instructions that, when executed, cause a computing system to perform a method comprising:
    receiving event logs obtained from multiple network devices in a network, wherein the multiple network devices include a first network device and other network devices in the network;
    generating tasks performable to remediate the one or more event logs;
    receiving health data for the other network devices, wherein the health data from the other network devices includes a number of the other network devices that are currently online; and
    prioritizing the tasks to the first network device based on the health data for the other network devices, including prioritizing the tasks based upon the number of the other network devices that are currently online.

7. The one or more computer-readable device of claim 6, wherein the method further comprises:
    receiving historical task data for the first network device and determining if the event logs associated with the first network device are abnormal relative to the historical task data and ignoring the event logs associated with the first network device if it is abnormal.

8. The one or more computer-readable device of claim 6, wherein the multiple network devices are within a same network as the first network device.

9. The one or more computer-readable device of claim 6, wherein the health data for the other network devices is used to determine capacity of the network where the first network device is located.

10. The one or more computer-readable device of claim 9, wherein the first network device is located in a data center.

11. The one or more computer-readable device of claim 6, wherein the health data for the other network devices is used to determine a number of downed connections within a data center that the first network device is located.

12. The one or more computer-readable device of claim 6, wherein the first network device and the other network devices are routers.

13. The one or more computer-readable device of claim 6, wherein the method further comprises:
    calculating a score for the first network device using the health data of the other network devices and using the score in the prioritizing of the tasks.

14. The one or more computer-readable device of claim 13, wherein the method further comprises:
    receiving information related to manufacturers of the other network devices and the first network device and using the received information related to the manufactures in the calculation of the score.

15. A system comprising at least one computing device configured to implement one or more services, wherein the one or more services are configured to perform a method comprising:
    identifying, based on one or more event logs obtained from a network computing device, one or more functional issues associated with the network computing device, wherein the network computing device is in a data center;
    generating one or more tasks performable to address the identified one or more functional issues associated with the network computing device;
    receiving health data for other network devices in the data center, wherein the health data includes information relating to whether the other network devices are online;
    prioritizing the one or more tasks to the first network device based on the health data for the other network devices, including whether the other network devices are online; and
    transmitting the one or more tasks to the network computing device.

16. The system of claim 15, wherein the one or more services are further configured to perform the method, comprising:
    determining, based at least in part on historical task data for the network computing device, whether the one or more tasks comport with tasks previously performed by the network computing device;
    if determined that the one or more tasks fail to comport with the tasks previously performed by the network computing device, remove a number of tasks from the one or more tasks; and
    if determined that the one or more tasks comport with the tasks previously performed by the network computing device, enable prioritization of the one or more tasks based at least in part on the obtained health data.

17. The system of claim 15, wherein the one or more services are further configured to calculate a device score for the network computing device based at least in part on the obtained health data from the other network devices, the device score indicating whether the network computing device is capable of performing any of the one or more tasks.

18. The system of claim 15, wherein the one or more services are further configured to:
    determine whether the one or more tasks transmitted to the network computing device have been performed successfully by the network computing device;
    if determined that a task of the one or more tasks was not completed successfully:
        obtain new health data associated with the network computing device; and
        based at least in part on the obtained new health data, reprioritize the one or more tasks such that the task is performed after other tasks are successfully completed.

19. The system of claim 15, wherein the health data includes network capacity available for the other network devices in the data center.

* * * * *